Patented Mar. 12, 1940

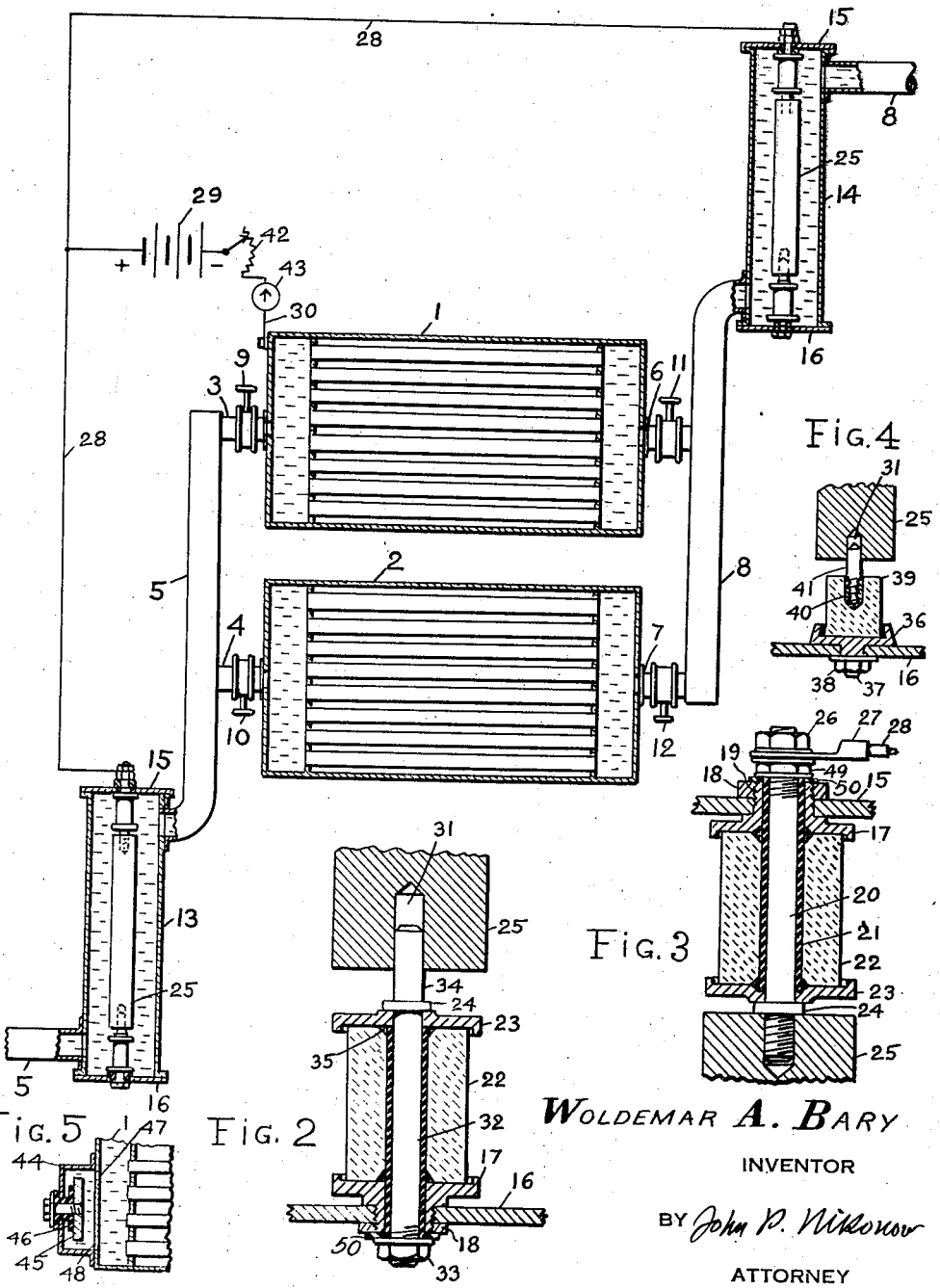

2,193,667

UNITED STATES PATENT OFFICE 2,193,667

APPARATUS FOR ELECTROLYTIC
PROTECTION OF VESSELS

Woldemar A. Bary, New York, N. Y.

Application December 18, 1937, Serial No. 180,524

2 Claims. (Cl. 204—1)

My invention relates to apparatus for preventing corrosion of vessels containing liquids and appearance of scale in such vessels as condensers and boilers, and other heat exchangers.

It has been known even as far back as the last century (see, for instance, patent to Farmer, No. 88,285, of 1869) that it is possible to prevent corrosion and scale in boilers by connecting them to the negative terminal of a battery and introducing a positive anode into water in the boiler. The effectiveness of this method is now generally recognized. For its proper application, however, it is necessary to have sufficient free space available in a vessel for the anode itself, for clearances between the anode and the nearest protected surfaces, and for the insulators supporting the anode and conducting current to it.

The insulators, in order to prevent an excessive leakage of current over their surfaces, should be also several inches long in view of the fact that they are immersed in a more or less conducting liquid. It is difficult, therefore, to make a successful installation where the available space is less than ten or twelve inches in width. In certain cases, however, the clearance between the outer wall and the inner tubes in a boiler, condenser or similar vessel is too small for such an installation.

It should be noted, however, that while it is desirable to provide a distance of about four inches between the face of the anode and the opposing negative surface of the protected vessel, the protective effect of the anode is not limited to the particular opposing surface but extends also to other parts of the vessel over which circulates water ionized by its passage through the four inch clearance. The main effect of the anode is that it attracts injurious negative ions such as Cl, SO₄, O₂, etc., also that it permits maintaining negative charge on the surfaces of the vessel which thereby repel the negative ions. In this connection I have found that beneficial results can be obtained with a separate ionizing container or apparatus placed outside of the vessel to be protected, in the path of a liquid circulating through the vessel. The best results are obtained when the protecting container is placed in the intake pipe of the vessel, although its beneficial effect can be also observed when the container is placed in the exhaust pipe. For this reason I prefer to place one protective container in the intake pipe and one in the exhaust pipe, such an arrangement being especially effective when direction of the liquid flow is periodically reversed, or when several vessels are connected with the same intake and exhaust circulation pipes and provided with individual valves so that they can be alternately connected with the pipes. This arrangement is used to advantage with boilers or vessels having batteries of inner tubes with clearances insufficient for the installation of protective anodes. My containers are also effective for protection of pipes extending from the container.

My invention has for its object therefore to provide separate containers placed in the pipes extending from a vessel which it is desired to protect against corrosion and scale, the containers being preferably closed to the outside so that liquids can circulate through them without being exposed to the atmosphere. Suitable anodes are supported in the containers on insulators in the path of the liquid and are connected with the positive terminal of a source of direct current such as a battery or current rectifier or generator. In such cases it is also desirable to provide a clearance of about four inches (or from 3 to 5 inches) between the face of the anode and the walls of the container. The latter can be preferably made in the form of a tubular vessel with a cylindrical anode inside supported at its ends.

Another object of my invention is to provide insulators for supporting the ends of the anode in the container and for conducting current to one end of the anode, the insulators being arranged so as to allow free expansion and contraction of the anode with the changes in temperature irrespective of the corresponding variations in lengths or changes caused in the container itself or in the insulators, also by the gradual deterioration of the anodes. This provision is necessary in view of the fact that the metal of the anode usually has different temperature coefficient from the walls of the container and from the material of the insulators. For this purpose I provide an insulator at one end rigidly connected with the anode and having a conductor inside extending from the anode to the outside of the container, the other insulator having sliding connection with the corresponding end of the anode. This can be accomplished, for instance, by providing a bore in the end of the anode into which slidably fits the end of the insulator.

Another object of my invention is to provide means to control the current passing through the liquid.

My invention is more fully described in the accompanying specification and drawing in which—

Fig. 1 is a sectional elevational view of a system including two vessels connected with circulating pipes having my protective ionizing containers at either end of the vessel, electrical connections being shown diagrammatically.

Fig. 2 is a detail view of an insulator slidably supporting the lower end of an anode.

Fig. 3 is a detail view of an insulator supporting the upper end of the anode with an electric conductor inside.

Fig. 4 is a detail view of a modified insulator for supporting the lower end of the anode.

Fig. 5 is a fractional view of a modified container.

My system can be used with a variety of practical installations including boilers, condensers, evaporators, heat exchangers, etc., and in the accompanying drawing a system is shown, by the way of an example, with two vessels 1 and 2 having heat exchange tubes inside. The vessels are connected by pipes 3 and 4 with an intake pipe 5 and by pipes 6 and 7 with an exhaust pipe 8. The direction of flow can be reversed, however, so that the intake pipe may become exhaust, and the exhaust pipe may become intake. Valves 9 and 10 are placed in the pipes 3 and 4, and valves 11 and 12 are placed in the pipes 6 and 7. These valves are used for disconnecting one or the other vessel for its cleaning, repairs, etc.

Containers 13 and 14 of preferably identical construction are placed in the pipes 5 and 8. The containers represent cylindrical bodies with flanges on top and bottom for covers 15 and 16. The pipes are connected with the upper and lower portions of the container so as to cause the liquid to flow from one end of the container to the other.

The covers 15 have central holes for flanged members 17 secured by nuts 18 screwed on the upper threaded portions 19. The members 17 are bored inside for rods 20 with insulation tubes 21 on the outside passing also through insulators 22 made of porcelain or other suitable composition. The upper end of the insulator rests against the flange of the member 17 and the lower end abuts a flange 23 resting against an annular enlarged portion 24 of the rod 20. The outer end of the rod is threaded into the upper end of an anode 25. The upper end of the rod is threaded and provided with a nut 49 for clamping the insulator. An insulation washer 50 is placed between the end of the member 19 and the nut 49. There is also provided a nut 26 for clamping a terminal 27 of a conductor 28 connecting the rods of both ionizing containers. The conductor 28 is connected with the positive terminal of a battery or other suitable source of direct current 29. The negative terminal is connected by a lead 30 with the apparatus 1. The latter, being metallically connected with the apparatus 2 and with the pipes, communicates its negative charge to all the other parts of the system including the bodies of the containers 13 and 14. It may be noted that the insulators are self contained and retain their structure when removed from the covers 15 and 16 and unscrewed from their anodes.

The lower ends of the anodes have bores 31 slidably fitting over the ends of rods 32. The latter have enlarged portions 24 engaging flanges 23 holding insulating spacers 22 whose lower ends rest against flanges of tubular members 17 clamped in the covers 16 by nuts 18. Nuts 33 clamp the spacers 22 between the flanges and render the insulators self contained. The rods 32 have smooth extensions 34 on top for the bores 31. The joints between the flanges, tubes 21 and insulation spacers 22 are made watertight by a suitable cement 35.

A modified lower support for the anode is shown in Fig. 4. A flange 36 has a threaded stem 37 passing through a hole in the cover 16 and tightened with a nut 38. An insulation spacer 39 is cemented into the flange 36 and has a bore 40 on top into which is cemented threaded or serrated end of a rod 41. Its upper end is smooth and slidably fits in the bore 31 of the anode.

The strength of the current passing through the liquid can be regulated by an adjustable resistor 42 with an electric meter 43.

A modified arrangement is shown in Fig. 5, an external container 44 being directly attached to the outer wall of the vessel 1. An anode 45 is supported inside on an insulator 46. Holes 47 and 48 provide communication with the inside of the vessel 1.

I claim as my invention:

1. An electrolytic protective element for a vessel, comprising a container, a cover at the upper end of the container, a bolt extending through the cover and insulated therefrom, flanged members fitted on the bolt in spaced relation to each other, an insulation member clamped between the flanges, an anode attached to the lower end of the bolt, an insulator mounted on the bottom of the container, and an extension on the insulator, the anode having a bore in the lower end slidably engaging the insulator extension.

2. An electrolytic protective element for a vessel, comprising a tubular container having flanges at the ends and openings for intake and exhaust pipes, upper and bottom covers attached to the flanges, a bolt extending through the upper cover and insulated therefrom, flanged members fitted on the bolt in spaced relation to each other, an insulation member clamped between the flanges, an anode attached to the lower end of the bolt, an insulator mounted on the bottom cover of the container, and a stud supported on the insulator, the anode having a bore in the lower end slidably engaging the stud.

WOLDEMAR A. BARY.